Nov. 20, 1934.  V. G. APPLE  1,980,974
VEHICLE BRAKE MECHANISM
Filed July 16, 1928   2 Sheets-Sheet 1
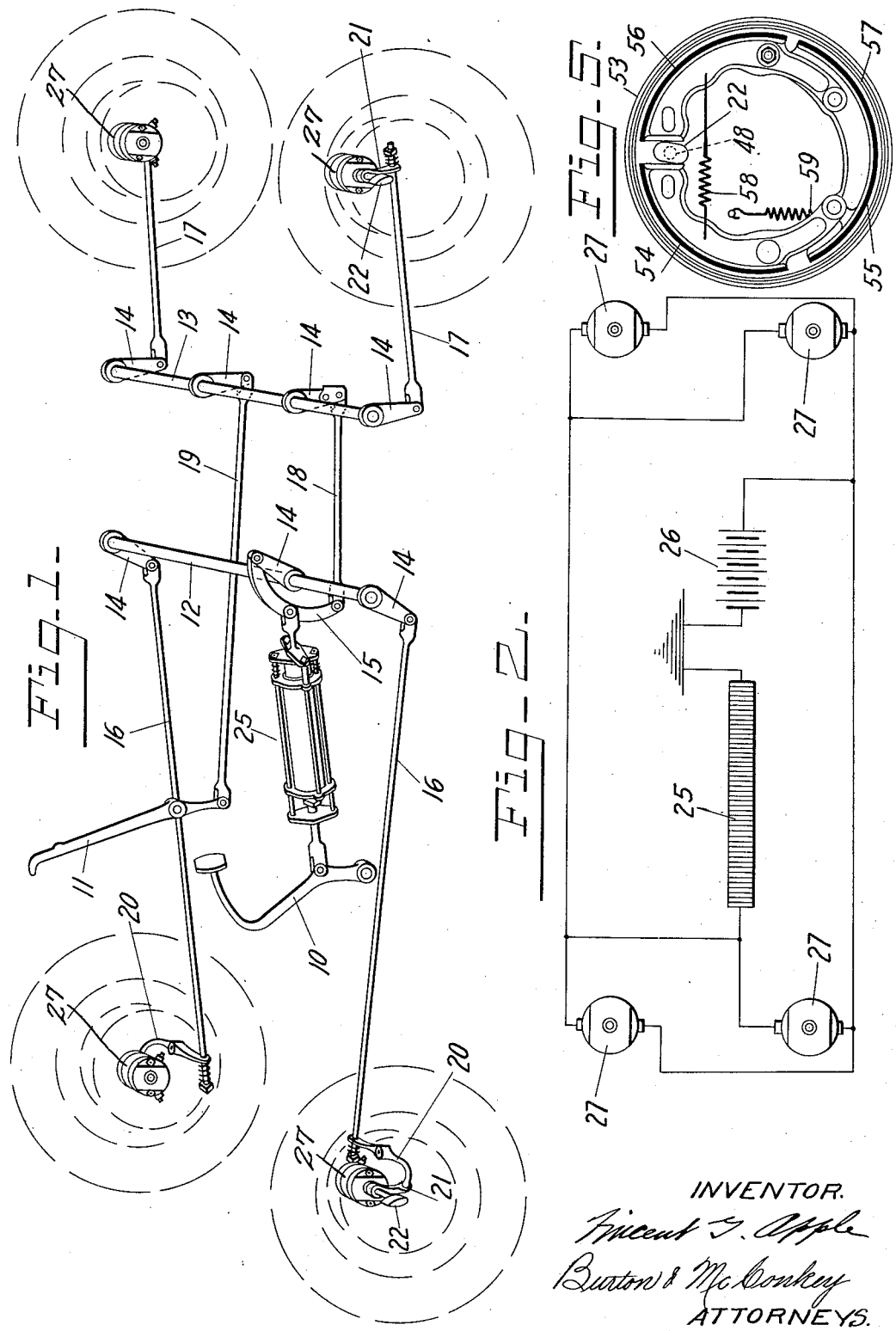

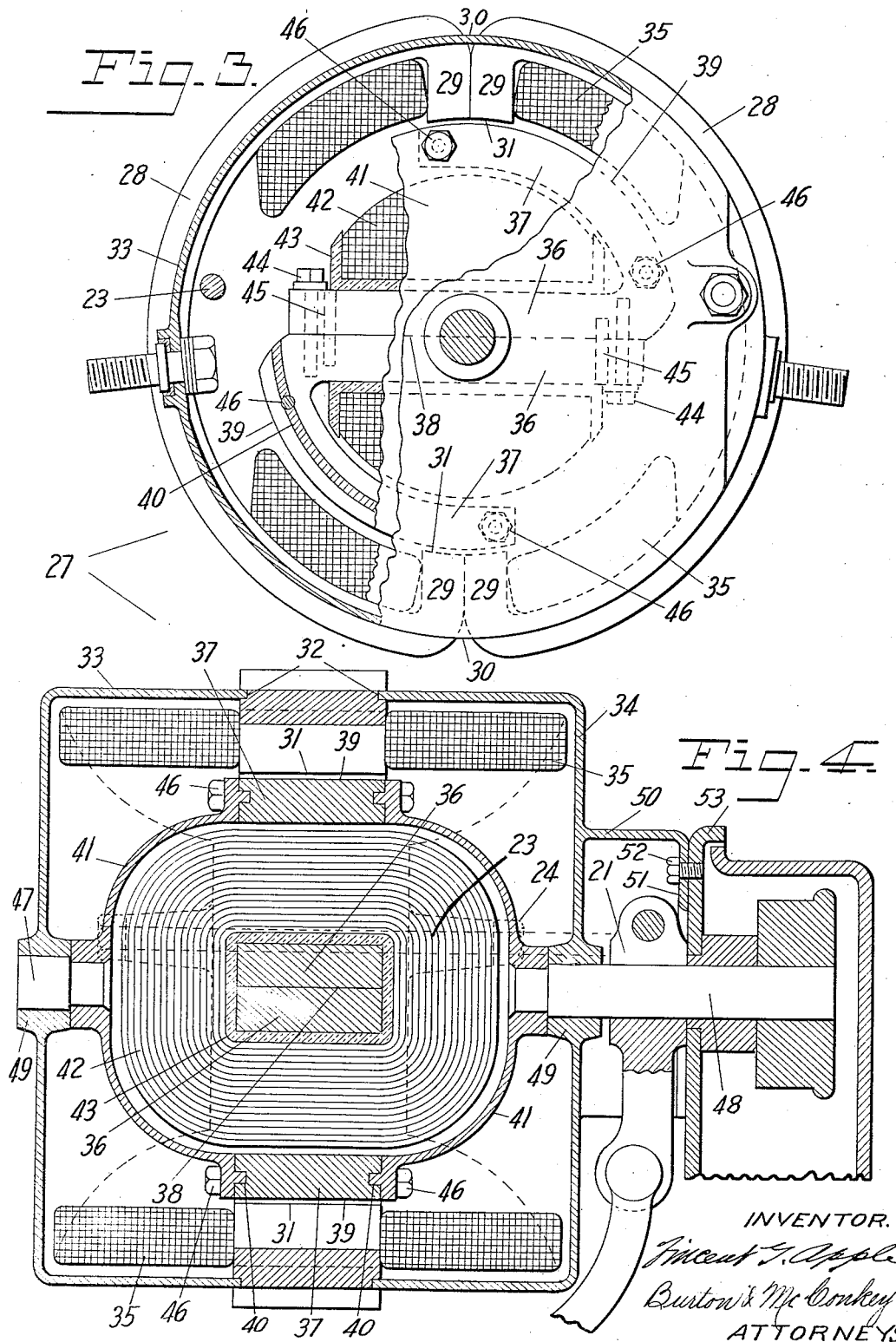

Registered Nov. 20, 1934                                            1,980,974

UNITED STATES PATENT OFFICE 1,980,974

VEHICLE BRAKE MECHANISM

Vincent G. Apple, Dayton, Ohio, assignor to Bendix Brake Company, South Bend, Ind., a corporation of Illinois Application July 16, 1928, Serial No. 293,192

4 Claims. (Cl. 188—156)

My invention relates to brake mechanism adapted for manual or power operation and particularly mechanism of this class as applied to a motor vehicle.

An object is to provide in brake mechanism of the character described, an electric power device for and at each wheel to operate the brake on such wheel, which power device is preferably carried by the backing plate of the brake and has an armature shaft extending through said backing plate, which shaft is provided within the drum with a brake-applying part and outside of the drum with a manually operable connection whereby the brake may be manually actuated.

An important feature is the provision of brake mechanism of the type set forth wherein the brakes may be applied electrically or mechanically and the electrical operation thereof does not interfere with the mechanical linkage used in applying the brakes manually.

Another object consists in the employment of control mechanism operable to regulate the electric power devices to exert brake applying power on the brakes in proportion to the manual effort exerted to apply the brakes and particularly to an electric magnetic device associated with each brake in such a manner as to apply the brake without affecting the manually operated means provided for the same purpose.

Other objects, advantages and important features of my invention will more fully appear from the following description, appended claims and accompanying drawings, wherein, Fig. 1 is a perspective view of an embodiment of my invention comprising mechanical brake operating linkage and the electro-magnetic means adapted to operate in conjunction therewith.

Fig. 2 shows diagrammatically the wiring connections to the source of current supply.

Fig. 3 is a cross section taken through the electro-magnetic structure at right angles to the axis.

Fig. 4 is a cross section taken through the electro-magnetic structure along the axis.

Fig. 5 is a side elevation of conventional brake mechanism adaptable for use with my invention.

The mechanical linkage shown in Fig. 1 is of that type employed in four wheel automotive braking systems, having means to distribute the manual brake applying effort in a predetermined ratio between the front and rear wheels, and comprises a pedal 10, an emergency lever 11, front brake shaft 12, rear brake shaft 13, brake arms 14, equalizing link 15, brake rods 16, 17, 18 and 19, control levers 20, cam levers 21 and cams 22.

In the ordinary manually operable braking system, pedal 10 is connected to equalizing link 15 by a rod similar to rod 19, whereas to incorporate my improvement this rod is replaced with a controller 25. This controller is fully described and illustrated in my Patent No. 1,841,272, January 12, 1932.

Briefly described, controller 25 comprises an insulation lined metal cylinder containing a plurality of graphite discs in indifferent contact through which the electric current may pass, combined with linkage so arranged that tension in the linkage compresses the column of discs to lower the contact resistance therebetween and consequently to increase the current flow, to the end that variation in pressure on pedal 10 varies the current carrying capacity of the circuit of which the controller and the electro-magnetic elements are a part.

Fig. 2 is a diagram of the electrical circuit wherein 25 is the controller, 26 is a battery and 27, 27 etc., are the electro-magnetic elements. The connections shown grounded represent connections to a metal member of the vehicle frame.

One of the four electro-magnetic elements 27 Fig. 1 is shown to an enlarged scale in Figs. 3 and 4. The field core is formed from two bars of rectangular cross section bent to semicircular form as at 28 and having the ends turned inwardly as at 29 to form poles, then welded together and filled in as at 30.

The poles 29 are bored at 31 to suitably clear the armature diameter and annular grooves 32 concentric with the armature bore locate bearing heads 33 and 34 while bolts 23 and nuts 24 hold them against axial movement. Field coils 35 surround the poles to create the desired field flux.

The armature core is formed from two bars of rectangular cross section, each bent to a V form having one straight leg 36 and a curved leg 37. The two straight legs 36 are machined at 38 to make a magnetic joint, and the two curved legs 37 are turned at 39 to suitably clear the poles 29, and annular grooves 40 are turned in the edges of the bars concentric with the turned diameter to support journal heads 41. A coil 42 wound on a spool 43 of insulation surrounds straight legs 36 which are inserted in the coil, one leg from each end. Screws 44 and dowels 45 hold the two halves of the armature core together while screws 46 hold the journal heads 41 to the core. One relatively short journal 47 and a longer one 48 are secured in journal heads 41 and are free to rotate in hubs 49 of bearing heads 33 and 34.

Bearing head 34 differs from bearing head 33 in that it has an extension 50 which forms a housing over cam lever 21 and carries a flange portion 51 through which screws 52 extend to secure the electro-magnetic elements 27 to the brake backing plate 53. This method of mounting permits manual operation of the brakes either independently of or together with the electrical means.

In Fig. 5 there is illustrated a well known type of three shoe brake with which my invention may be employed. It is adaptable for use with any suitable type of brake. In this figure the backing plate 53 carries brake shoes 54, 55 and 56, which shoes are held away from the drum 57 by springs 58 and 59, and urged against the drum by the cam 22 which is carried by the shaft 48.

It will be understood that the electro-magnetic elements are required to turn through a small part of a revolution only whereby cams 22 are rotated to expand the brake shoes as in ordinary manually operable brakes. Except for size and the method of mounting, the electro-magnetic elements are similar to that shown and claimed in my co-pending application, Serial No. 285,090, and is therefore not broadly claimed herein.

What I claim is:

1. Vehicle brake mechanism, comprising, in combination, a backing plate, a rotatable drum, retarding means within the drum, an electric motor supported by and in spaced relationship from the backing plate, said motor having an armature shaft extending through and journalled in the backing plate and provided within the drum with mechanism operably connected with the retarding means to urge said means against the drum, an arm carried by the shaft and disposed within the space between the backing plate and the motor and manually operable brake applying mechanism connected with said arm.

2. Vehicle brake mechanism comprising, in combination, a backing plate, a rotatable drum, retarding means within the drum, an electric motor having a casing secured to the backing plate by a support shaped to form a housing, said motor having an armature provided with a shaft extending through the housing and through the backing plate into the drum and having within the drum mechanism operatively engaging the retarding means to urge it against the drum, an arm carried by the shaft and located within said housing and manually operable brake-applying mechanism having a part engaging said arm to rotate the shaft to apply the brakes.

3. Vehicle brake mechanism comprising, in combination, a brake drum, a backing plate, retarding means within the drum including an operating shaft extending through the backing plate and provided on the opposite side thereof with an arm, an electric power device secured to the backing plate by an open housing enclosing said arm, said power device coupled with said shaft to apply the brake, and manually operable applying mechanism engaging the arm to apply the brake and adapted to permit the shaft to be rotated independently thereof.

4. Vehicle brake mechanism comprising, in combination, a backing plate, a rotatable drum, retarding means within the drum, a power device supported by and in spaced relationship from the backing plate, said power device having a shaft extending through the backing plate and provided within the drum with mechanism operably connected with the retarding means to urge said means against the drum, and manually operable means operably connected with said shaft within the space between the backing plate and the power device for manually urging said retarding means against the drum.

VINCENT G. APPLE.